United States Patent
O'Donnell et al.

(10) Patent No.: US 8,443,003 B2
(45) Date of Patent: May 14, 2013

(54) CONTENT-BASED INFORMATION AGGREGATION

(75) Inventors: Tony O'Donnell, Kildare Town (IE);
Paul Sheedy, Dublin (IE); Udaya Kumar, Citywest (IE)

(73) Assignee: Business Objects Software Limited, Dublin (IE)

( * ) Notice: Subject to any disclaimer, the term of this patent is extended or adjusted under 35 U.S.C. 154(b) by 0 days.

(21) Appl. No.: 13/206,731

(22) Filed: Aug. 10, 2011

(65) Prior Publication Data
US 2013/0041897 A1 Feb. 14, 2013

(51) Int. Cl.
*G06F 17/30* (2006.01)

(52) U.S. Cl.
USPC ........................................................ 707/795

(58) Field of Classification Search .................. 707/736, 707/737, 754, 749, 758, 795, 803
See application file for complete search history.

(56) References Cited

U.S. PATENT DOCUMENTS

| | | | |
|---|---|---|---|
| 6,564,263 B1 * | 5/2003 | Bergman et al. | 709/231 |
| 7,716,255 B2 * | 5/2010 | Stuhec | 707/803 |
| 7,937,400 B2 * | 5/2011 | Carmeli et al. | 707/758 |
| 8,024,342 B2 * | 9/2011 | Li et al. | 707/736 |
| 8,126,899 B2 * | 2/2012 | Smith et al. | 707/755 |
| 8,209,338 B2 * | 6/2012 | Wallace et al. | 707/749 |
| 8,224,851 B2 * | 7/2012 | Banda et al. | 707/781 |
| 2005/0154708 A1 * | 7/2005 | Sun | 707/3 |
| 2007/0043761 A1 * | 2/2007 | Chim et al. | 707/102 |
| 2009/0043813 A1 | 2/2009 | Moore et al. | |
| 2009/0138454 A1 * | 5/2009 | Rayner et al. | 707/4 |
| 2009/0177955 A1 * | 7/2009 | Liu et al. | 715/200 |
| 2009/0299824 A1 | 12/2009 | Barnes, Jr. | |
| 2009/0313601 A1 | 12/2009 | Baird et al. | |
| 2009/0327289 A1 * | 12/2009 | Zentner | 707/6 |
| 2009/0327320 A1 | 12/2009 | Yan et al. | |
| 2010/0042615 A1 * | 2/2010 | Rinearson | 707/5 |
| 2010/0114996 A1 * | 5/2010 | Ding et al. | 707/812 |
| 2011/0106967 A1 | 5/2011 | Bellessort et al. | |
| 2011/0113047 A1 | 5/2011 | Guardalben | |
| 2011/0131218 A1 * | 6/2011 | Goldman et al. | 707/752 |
| 2012/0005594 A1 | 1/2012 | Lorch | |
| 2012/0150893 A1 * | 6/2012 | Inoue et al. | 707/758 |

FOREIGN PATENT DOCUMENTS

EP 2 110 760 A1 10/2009

OTHER PUBLICATIONS

Sander Evers "Form follows function: Editor GUIs in a functional style", Master's Thesis, Mathematics and Computer Science University of Twente, Mar. 2004, 86pgs.

European Patent Office, "Communication: Extended European Search Report", dated Sep. 24, 2012, for European Application No. 12005336.8-1527, 8pgs.

\* cited by examiner

*Primary Examiner* — Cam-Linh Nguyen
(74) *Attorney, Agent, or Firm* — Buckley, Maschoff & Talwalkar LLC (57) ABSTRACT

A system includes reception of first data content, generation of a first semantic representation of the first data content, determination of whether the first semantic representation is similar to a second semantic representation of second data content, generation of a third semantic representation based on the first semantic representation and on the second semantic representation, and association of the third semantic representation with the first data content and with the second data content if the first semantic representation is similar to the second semantic representation, and association of the first semantic representation with the first data content if the first semantic representation is not similar to the second semantic representation.

18 Claims, 8 Drawing Sheets

Feed Store 312

| Hash | Pointer |
|---|---|
| 1 | www.newsonline.co... |
| 2 | www.sportsonline.co... |

Graph Store 315

| Graph_id | Hash(es) |
|---|---|
| 34 | 1 |
| 36 | 2 |

*FIG. 4A*

Feed Store 312

| Hash | Pointer |
|---|---|
| 1 | www.newsonline.co... |
| 2 | www.sportsonline.co... |
| 12 | rss.worldreport... |

Graph Store 315

| Graph_id | Hash(es) |
|---|---|
| 34 | 1 |
| 36 | 2 |

*FIG. 4B*

Feed Store 312

| Hash | Pointer |
|---|---|
| 1 | www.newsonline.co... |
| 2 | www.sportsonline.co... |
| 12 | rss.worldreport... |

Graph Store 315

| Graph_id | Hash(es) |
|---|---|
| 34 | 1, 12 |
| 36 | 2 |

*FIG. 4C*

Feed Store 312

| Hash | Pointer |
|---|---|
| 1 | www.newsonline.co... |
| 2 | www.sportsonline.co... |
| 12 | rss.worldreport... |
| 22 | www.newsonline.co... |

Graph Store 315

| Graph_id | Hash(es) |
|---|---|
| 34 | 1, 12 |
| 36 | 2 |

*FIG. 4D*

Feed Store 312

| Hash | Pointer |
|---|---|
| 1 | www.newsonline.co... |
| 2 | www.sportsonline.co... |
| 12 | rss.worldreport... |
| 22 | www.newsonline.co... |

Graph Store 315

| Graph_id | Hash(es) |
|---|---|
| 34 | 1, 12 |
| 36 | 2 |
| 40 | 22 |

*FIG. 4E*

Feed Store 312

| Hash | Pointer |
|---|---|
| 1 | www.newsonline.co... |
| 2 | www.sportsonline.co... |
| 12 | rss.worldreport... |
| 22 | www.newsonline.co... |

Graph Store 315

| Graph_id | Hash(es) |
|---|---|
| 34 | 1, 12 |
| 36 | 2, 25, 27, 28 |
| 40 | 22 |

CONTENT-BASED INFORMATION AGGREGATION

BACKGROUND

The amount of available digital content is enormous and rapidly increasing. Considering the World Wide Web alone, a typical user may access billions of substantially-static Web pages including archival information, as well as live data sources such as news and social networking feeds, microblogging sources, and periodically-updating output from media outlets. Within large enterprises, additional accessible information includes corporate websites, wikis, document repositories, support forums and knowledge bases.

The foregoing circumstances present several challenges to a user. First, the user requires a system for locating particular information within this huge and growing information pool. Conventional search engines provide a fairly effective approach to this challenge in most usage scenarios.

On the other hand, a user may wish to utilize the available digital information to keep abreast of developments related to certain topics. Some systems allow a user to subscribe to "alerts" related to topics of interest, or to build personalized "digital newspapers" which are periodically updated with information relating to topics of interest. However, such systems do not efficiently cope with the vast replication of information across the available information sources. Consequently, these systems either present the user with several content items (e.g., articles) pertaining to the same piece of knowledge (e.g., a news event) but received from different sources, or these systems limit the data sources so that only one content item is received for each piece of knowledge.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
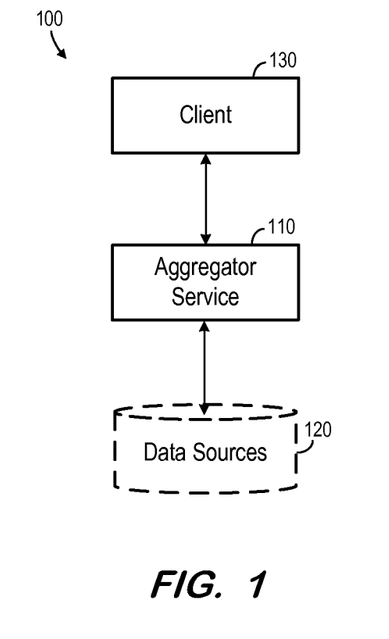
FIG. 1 is a block diagram of a system according to some embodiments.

FIG. 1 is a block diagram of environment 100. Environment 100 represents a logical architecture for describing some embodiments, and actual implementations may include more or different components arranged in any manner. The elements of environment 100 may represent software elements, hardware elements, or any combination thereof. For example, environment 100 may be implemented using any number of computing devices, and one or more processors within environment 100 may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

Environment 100 includes aggregator service 110, data sources 120 and client 130. Aggregator service 110 may operate to receive data content from data sources 120 and to provide the data content to client 130. As described below, aggregator service 110 may determine a similarity between two or more pieces of data content and create an association between such two or more pieces of data content in order to provide efficient consumption thereof by client 130. Aggregator service 110 may comprise an application running on an application platform which provides a suite of applications, such as but not limited to an enterprise resource platform. According to some embodiments, aggregator service 110 is an application executed within a client device.

Data sources 130 are represented using a dashed line to indicate that any number and types of data sources may be used in conjunction with some embodiments. Non-exhaustive examples of data sources 130 include enterprise applications (e.g., SAP CRM, SalesForce.com), social networks (e.g., Facebook, LinkedIn), groupware data (e.g., Microsoft Outlook files), the World Wide Web, one or more private intranets, one or more data warehouses, one or more text files, one or more spreadsheets and any other suitable data store and/or feed. Aggregator service 110 may include appropriate interfaces required for communicating with each type of data sources 120.

Client 130 may comprise a software application (e.g., a Web browser, a proprietary front-end application), a device (e.g., a desktop personal computer, a laptop personal computer, a tablet personal computer, a smartphone, etc.), or any combination thereof. Client 130 may receive information from aggregator service 110 via subscription and/or via discrete requests. Client 130 may provide a user interface to display data content associations generated by aggregator service 110.

Figure 2:
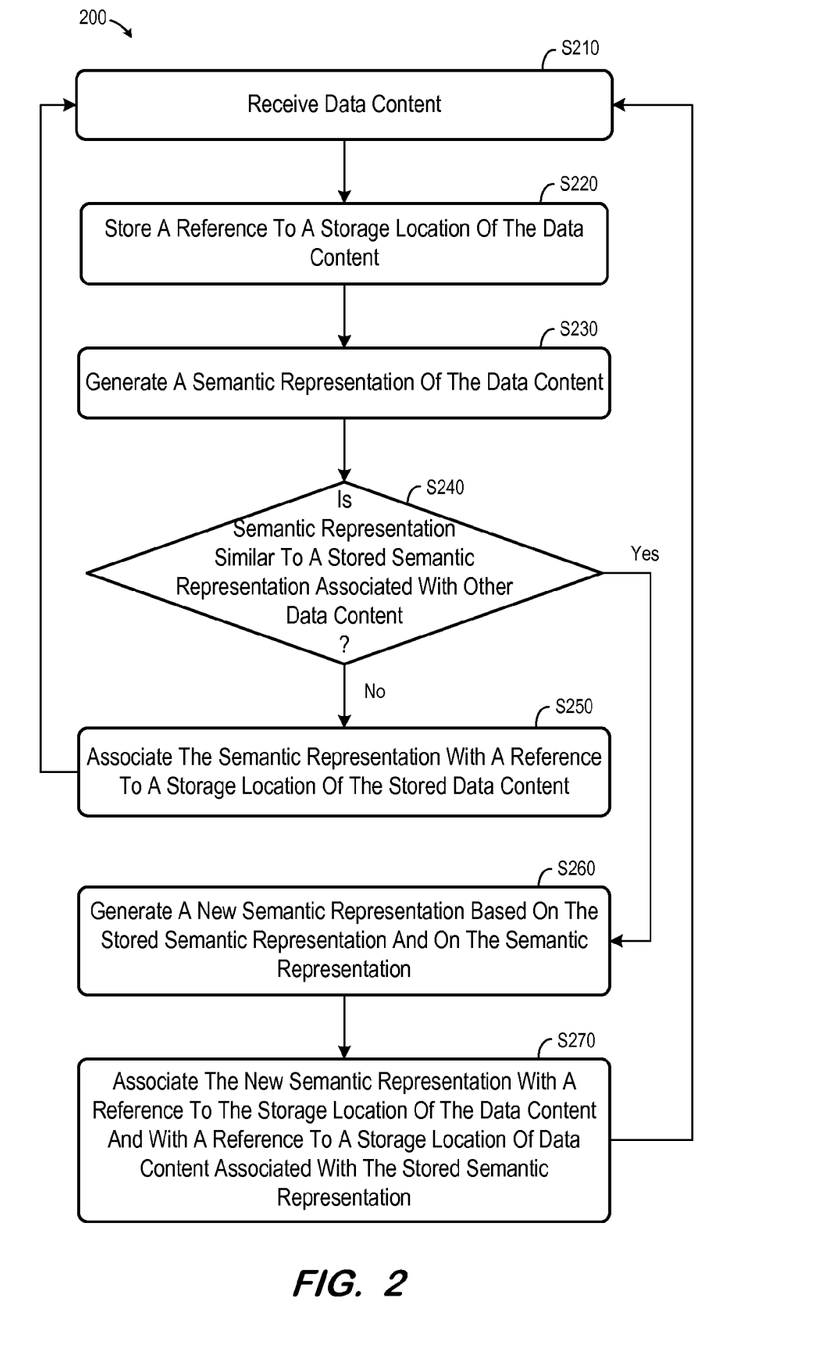
FIG. 2 is a flow diagram of a process according to some embodiments.

FIG. 2 comprises a flow diagram of process 200 according to some embodiments. Process 200 may be executed by aggregator service according to some embodiments. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
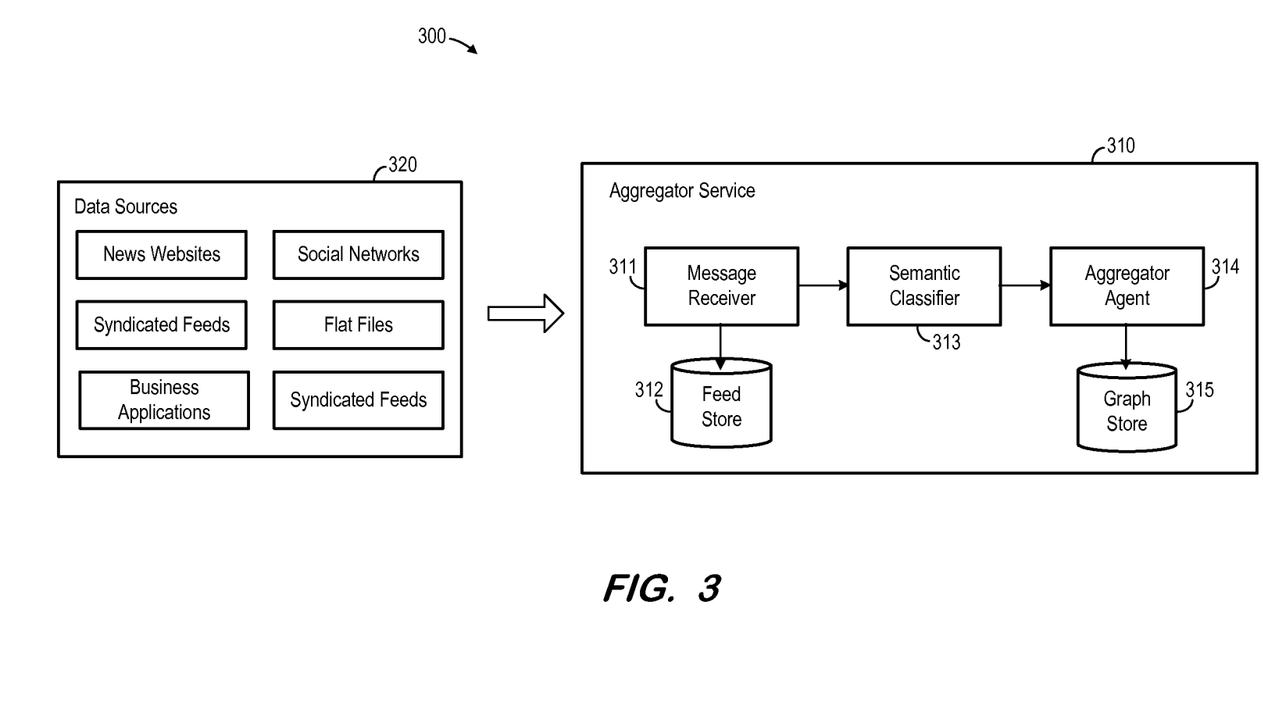
FIG. 3 is a block diagram of a system according to some embodiments.

FIG. 3 illustrates system 300 according to some embodiments. System 300 may comprise an implementation of environment 100, but embodiments of environment 100 and of system 300 are not limited thereto. Examples of process 200 will be described below with respect to system 300.

Data content is initially received at S210. The data content may be pushed to aggregator service 310 by one or more data sources 320 based on a subscription (e.g., a feed), requested by aggregator service 310 from one or more data sources 320, obtained by a crawler of aggregator service 310, or otherwise received using any suitable mechanism that is or becomes known.

Next, at S220, a reference to a storage location of the data content is stored. For example, if the data content is a Web article associated with a particular Uniform Resource Locator, the particular Uniform Resource Locator may be stored at S220. In some embodiments, the storage location is different from a location from which the data content was received. In this regard, the received data content may be cached locally, and the stored reference may point to the cached location.

Figure 4A:
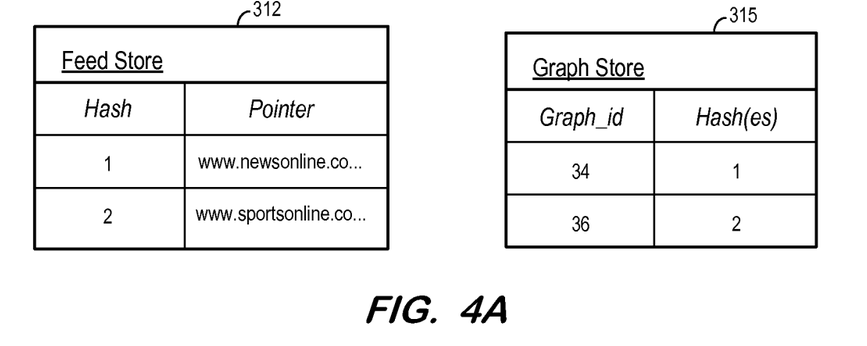
FIGS. 4A through 4F include tabular representations of stored data according to some embodiments.

According to the present example, the reference is stored in feed store 312. FIG. 4A includes a tabular representation of a portion of data stored within feed store 312 prior to the present example according to some embodiments. As shown, the stored references are pointers and each reference is associated with a hash to facilitate access to the reference via the hash. FIG. 4A also illustrates the contents of graph store 315 at the commencement of the presently-described example. These contents and the usage thereof will be described below.

Figure 4B:
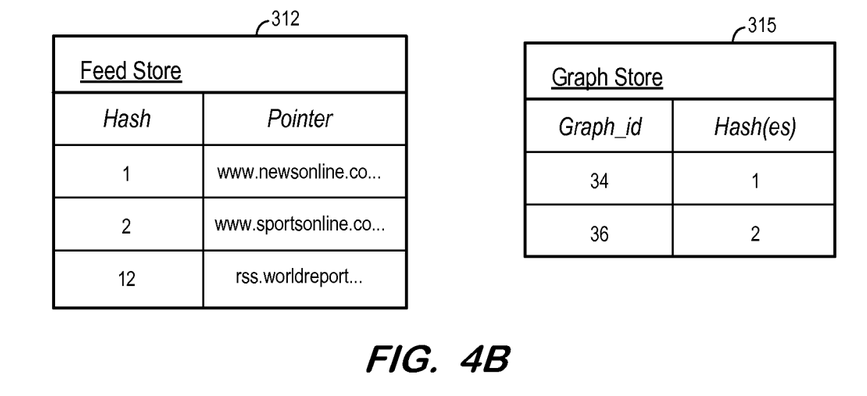

FIG. 4B illustrates the storage of a reference to a storage location at S220 according to some embodiments. More particularly, feed store 312 now includes a reference to an RSS feed, which is associated with hash "12". As also illustrated, graph store 315 is unchanged from FIG. 4B at this point of process 200.

A semantic representation of the received data content is generated at S230. Prior to generation of the semantic representation, the received data content may be transformed into a standardized format (e.g., Atom) which is suitable for input to the component which generates the semantic representation. According to the FIG. 3 embodiment, this component is semantic classifier 313.

Generally, and according to some embodiments, the semantic representation indicates two or more entity types and one or more instances of each of the entity types that exist within the data content. Therefore, generation of the semantic representation may consist of identifying entities which are present in the data content, determining an entity type of each entity, and creating a semantic digest which lists the determined entity types and the entities of each type which exist in the data content.

According to some embodiments, the semantic representation is a resource definition framework (RDF) graph, which may be instantiated as an eXtensible Markup Language (XML) document according to known techniques. For example, semantic classifier 313 may implement OpenCalais in order to receive Atom-formatted data content and to generate an XML document describing an RDF graph therefrom.

In a particular example of S230 according to some embodiments, it will be assumed that the following data content was received at S210:

'Stock prices rose this morning after positive results were announced by Acme Inc. The pharmaceutical giant has experienced revenue growth after releasing Paracetalin, a new cholesterol drug.'

A semantic representation (e.g., RDF graph) generated based on the above data content may include the following entities and entity instances (formatted below as entity: entity instances):

Company: Acme Inc.
Product: Paracetalin
Industry Term: cholesterol drug, stock prices, revenue growth, product release
Industry Type: pharmaceutical
Category: financial Next, at S240, it is determined whether the generated semantic representation is similar to any previously-stored semantic representation. In this regard, graph store 315 stores semantic representations which are respectively associated with (and were generated based on) the data content referenced in feed store 312. Such data content may have been received by aggregator service 310 and processed as described above prior to the present example. FIG. 4A and FIG. 4B each depict two semantic representations which existed within graph store 315 prior to the present example. Each of these representations was generated as described above based on the data content referenced in feed store 312 of FIG. 4A.

Therefore, according to the present example, the semantic representation of the data content received at S210 is compared with the semantic representations of graph store 315 to determine whether any sufficient similarities exist. According to some embodiments of S240, two semantic representations are compared with one another by first determining a number of entity instances which are shared between the two semantic representations. In some embodiments, also determined at S240 is a ratio of the number of shared instances to the number of instances of the smaller (i.e., measured by number of entity instances) semantic representation.

Both the number of shared instances and the ratio may be compared against respective thresholds to determine whether two semantic representations are similar. Flow proceeds from S240 to S260 if a stored semantic representation is determined to be similar to the current semantic representation. If the semantic representation generated at S230 is determined to be similar to more than one stored semantic representation at S240, S230 may also include calculating a similarity score for each of the more than one stored semantic representations based on each stored semantic representation's corresponding number of shared instances and determined ratio, and identifying the stored semantic representation associated with the highest similarity score.

A new semantic representation is generated at S260 based on the semantic representation generated at S230 and on the stored similar semantic representation identified at S240. According to some embodiments, S260 includes applying a UNION operation to the current semantic representation and the similar stored semantic representation to create a third semantic representation. Other methods for creating a new semantic representation based on two semantic representations may be employed at S260, including the methods described with respect to S230.

Figure 4C:
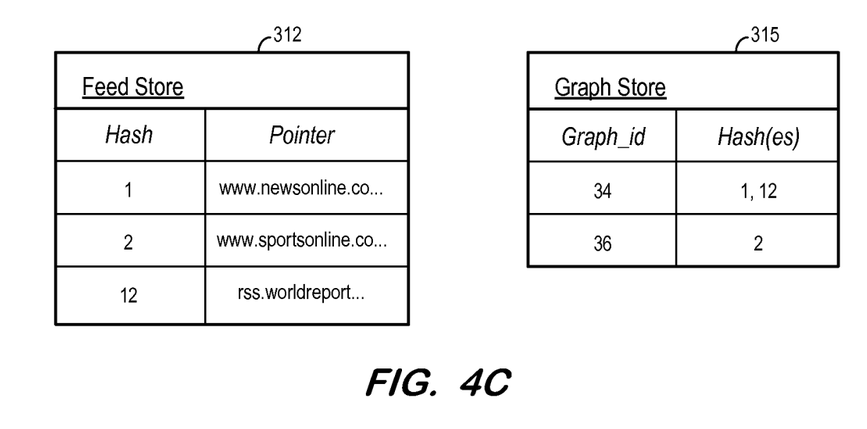

At S270, the new semantic representation is associated with the reference which was stored at S220, and with a reference to a storage location of data content associated with the stored semantic representation which was identified at S240. FIG. 4C illustrates associations created at S270 according to some embodiments. As shown, graph store 315 now associates graph_id "34" with hash "12". As described above, hash "12" is associated with a location of the data content received at S210. In the present example, graph_id "34" was associated with the previously-stored semantic representation and is now associated with the new semantic representation. Embodiments are not limited thereto (i.e., the new semantic representation may be associated with a new graph_id, which in turn is associated with hashes "1" and "12").

Figure 4D:
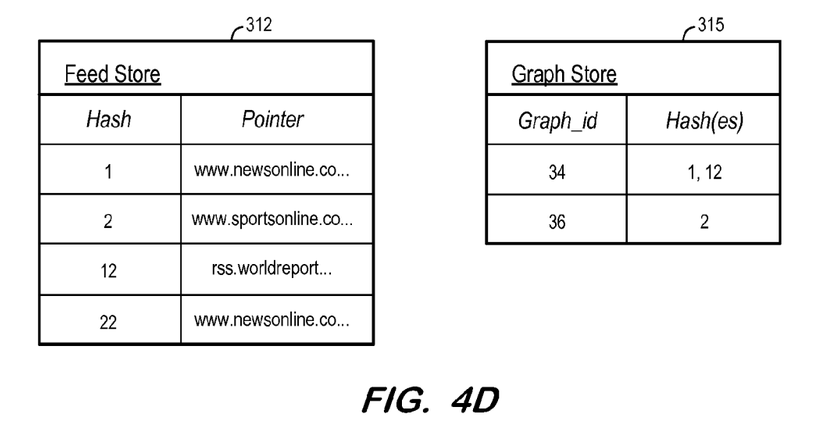

Flow returns to S210 from S270 to receive new data content as described above. Continuing the present example, FIG. 4D shows that new data content has been received at S210 and a reference (i.e., hash "22") to a storage location thereof (i.e., "www.newsonline.co . . . ") has been stored in feed store 312 at S220. A semantic representation of the data content is then generated at S230 as described above.

Figure 4E:
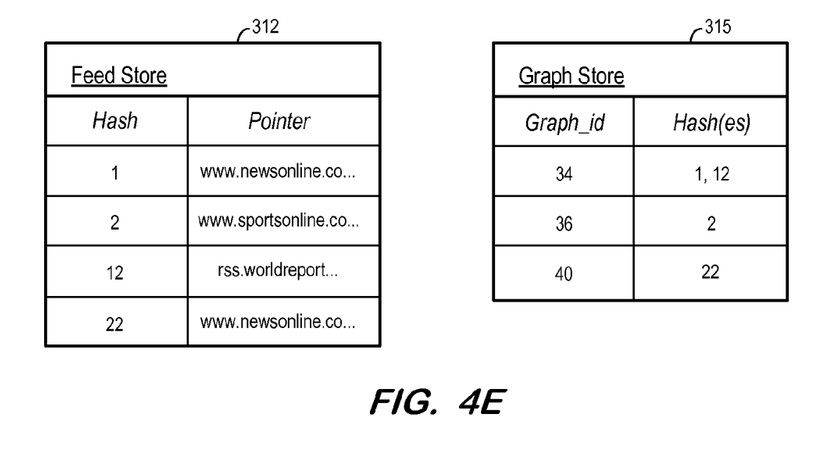

For purposes of the present example, it will be assumed that the semantic representation is not similar to any previously-stored semantic representations. Accordingly, the determination at S240 is negative and flow proceeds to S250. At S250, the semantic representation is associated with a reference to a storage location of the corresponding data content. FIG. 4E illustrates one embodiment in which a new entry has been added to graph store 315 at S250. The new entry includes a new graph_id "40" corresponding to the new semantic representation, and associates this graph_id with the hash "22" that is in turn associated with the storage location of the corresponding data content. Flow returns from S250 to S210 and continues as described above.

Figure 4F:
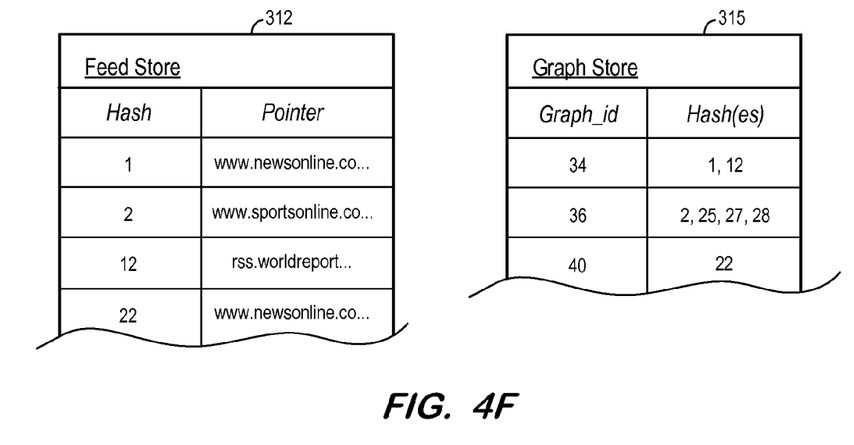

Accordingly, flow continues to cycle among S210 through S270 to receive data content, generate semantic representations based thereon, and to either update previously-stored semantic representations or store new semantic representations in association with references to corresponding data content. FIG. 4F illustrates feed store 312 and graph store 315 after several of such cycles. As shown, three additional references have been associated with graph_id "36" within graph store 315. Accordingly, a graph associated with graph_id "36" has been updated based on data content associated with each of the three references.

Figure 5:
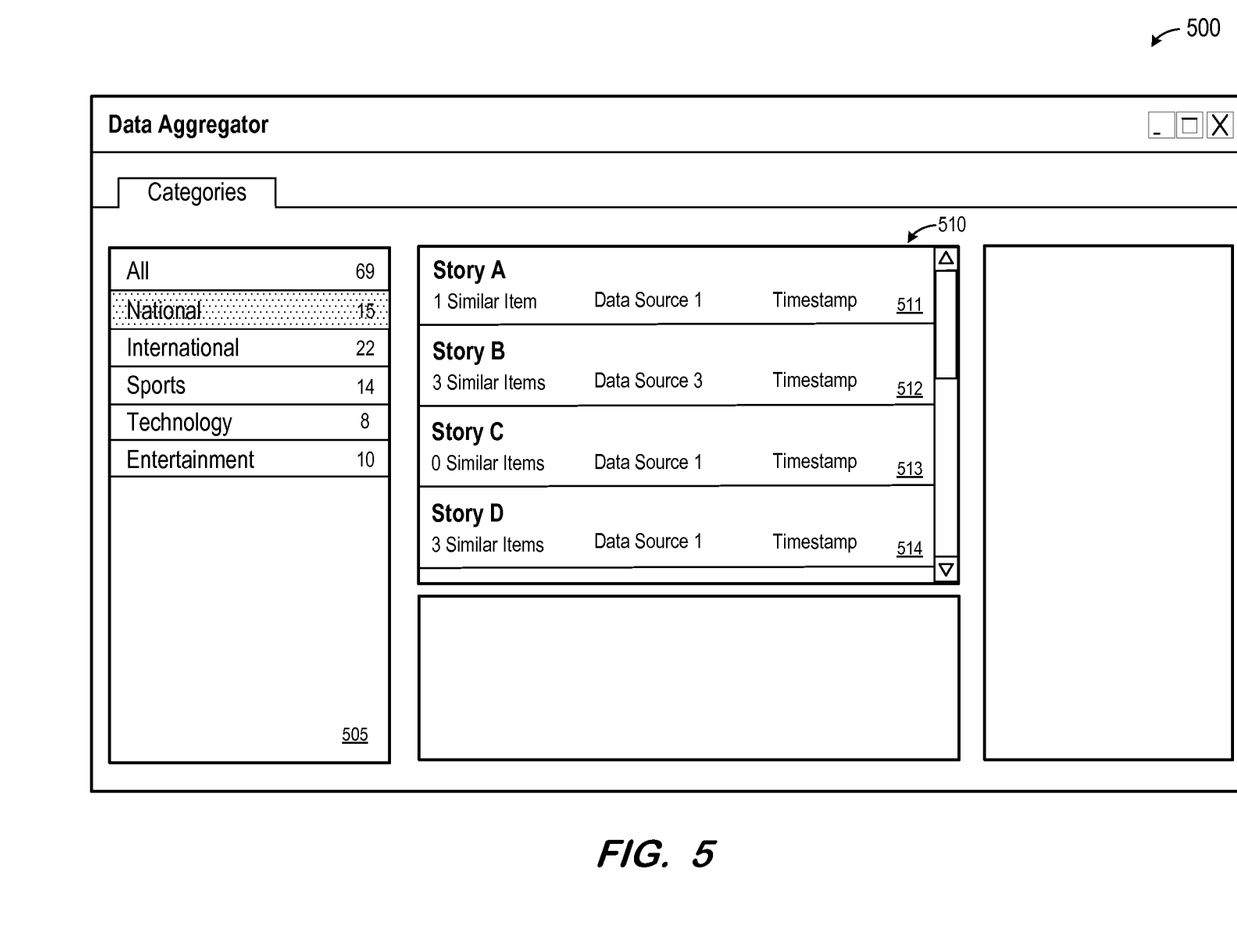
FIG. 5 is a view of a user interface according to some embodiments.

FIG. 5 is an outward view of graphical interface 500 according to some embodiments. Interface 500 may be displayed by a computing device (e.g., client 130) executing program code of a standalone application. Interface 500 may comprise a Web page displayed by a Web browser executed by such a computing device.

Interface 500 may display data provided by aggregator service 310. Specifically, aggregator service 310 may associate a subject tag with each entry of graph store 315, and area 505 may display the number of entries associated with each subject tag. As shown, a user has selected the tag "National". Accordingly, list 510 is created based on the graph store entries associated with the "National" tag.

For example, each member 511-514 of list 510 corresponds to a single entry (i.e., a single semantic representation) noted in graph store 315. Entry 511 corresponds to graph_id 34, entry 512 corresponds to graph_id 36 and entry 513 corresponds to graph_id 40. The primary data content of each member 511-514 (i.e., Story A, Story B, etc.) may be the data content associated with the first-listed hash of its corresponding graph store entry, but embodiments are not limited thereto. Each member 511-514 indicates a number of "similar items", which reflects the number of additional content references within its corresponding graph store entry. In the illustrated example, each member 511-514 also lists a data source and a timestamp associated with its primary data content. Such information may be stored in feed store 312, retrieved using the storage location information in feed store 312, or obtained by other means.

Figure 6:
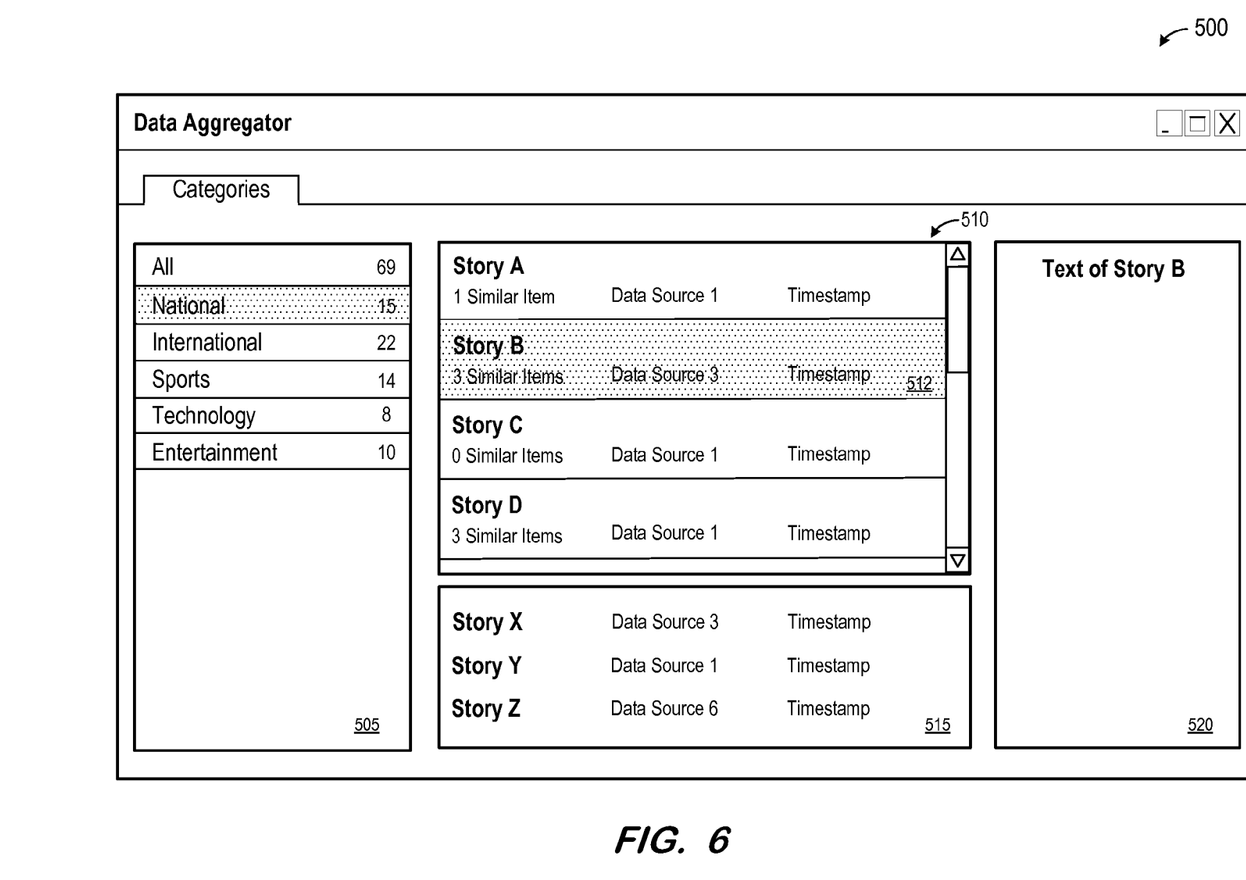
FIG. 6 is a view of a user interface according to some embodiments.

FIG. 6 shows interface 500 after selection of list member 512 according to some embodiments. In response to the selection, area 515 displays information related to the other data content referenced by the graph store entry to which member 512 corresponds. As shown in FIG. 4F, area 515 displays information related to content items associated with hashes "25", "27" and "28", each of which is associated with graph_id "36" in graph store 315. According to the present example, area 520 of interface 500 also displays the text of selected member 512 in response to the selection.

The user may select any content items listed in area 515 to review the text thereof in area 520. Similar functionality executes if the user proceeds to select another member of list 510. Moreover, selection of a different tag of area 505 results in the display of a list including one member for each stored semantic representation associated with the selected tag.

Some embodiments may therefore provide for efficient aggregation of received data content. This aggregation may be leveraged to facilitate intuitive and effective review of the data content.

Figure 7:
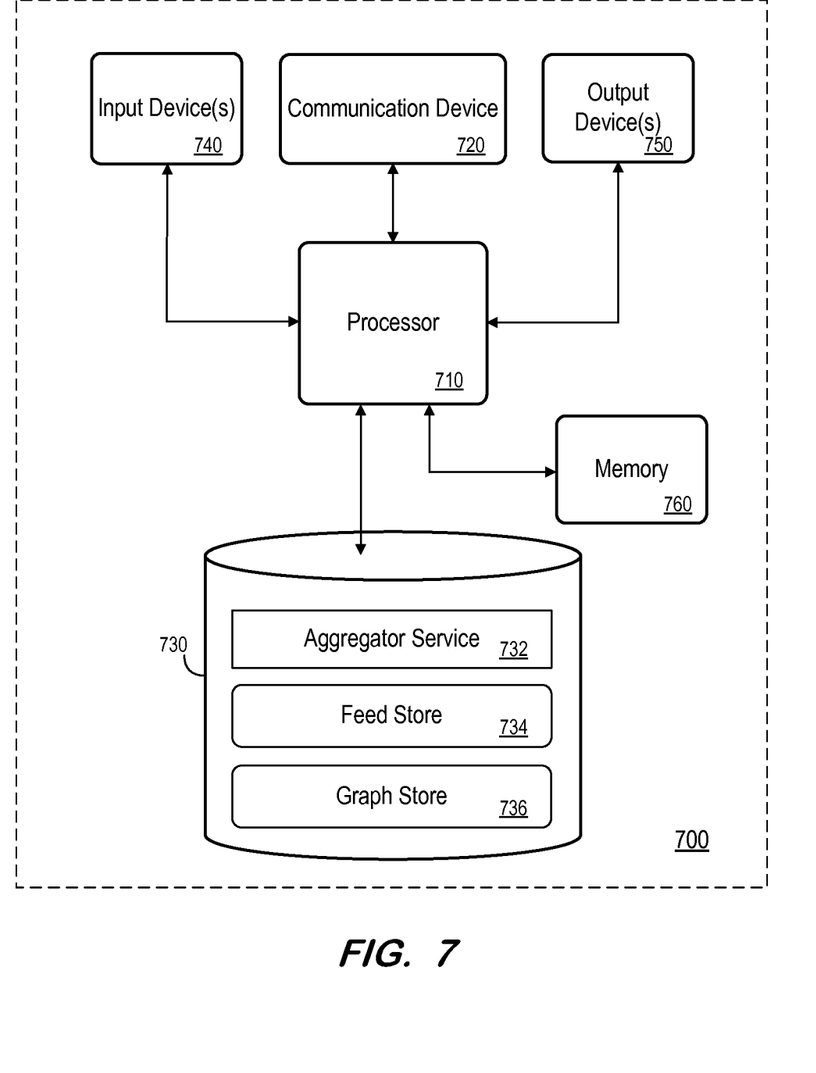
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of elements of aggregator service 110 and/or 310. Apparatus 700 may include other unshown elements according to some embodiments.

Apparatus 700 includes processor 710 operatively coupled to communication device 720, data storage device 730, one or more input devices 740, one or more output devices 750 and memory 760. Communication device 720 may facilitate communication with external devices, such as data sources including Web servers of the World Wide Web. Input device (s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate non-transitory storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Aggregator service 732 of data storage device 730 may comprise program code executable by processor 710 to provide functions described herein, including but not limited to process 200. Embodiments are not limited to execution of these functions by a single apparatus. Feed store 734 may associate data content references with storage locations of the data content, and graph store 736 may associate semantic representations with references to data content corresponding to the semantic representations.

Data storage device 730 may also store data and other program code for providing additional functionality and/or which are necessary for operation thereof, such as device drivers, operating system files, etc.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, comprising:
   receiving first data content;
   generating a first semantic representation of the first data content;
   determining whether the first semantic representation is similar to a second semantic representation of second data content;
   if the first semantic representation is similar to the second semantic representation, generating a third semantic representation based on the first semantic representation and on the second semantic representation, and associating the third semantic representation with the first data content and with the second data content;

if the first semantic representation is not similar to the second semantic representation, associating the first semantic representation with the first data content;

displaying a first view of a graphical interface, the first view of the graphical interface including a list that includes a plurality of members each being selectable by a user and corresponding to a respective semantic representation, each one of the plurality of members including an indication of data content associated with the semantic representation to which the one of the plurality of members corresponds, each one of the plurality of members indicating a number that reflects a number of additional content references that are associated with the semantic representation to which the one of the plurality of members corresponds;

wherein if the first semantic representation is similar to the second semantic representation and the third semantic representation is associated with the first data content and with the second data content:

a first one of the plurality of members in the list corresponds to the third semantic representation associated with the first data content and with the second data content, the first one of the plurality of members including an indication of the first data content, the first one of the plurality of members indicating a number that reflects a number of additional content references that are associated with the third semantic representation, one of the additional content references associated with the third semantic representation being the second data content;

the method further comprising:

after selection of one of the plurality of members in the list of the first view, displaying a second view of the graphical interface, the second view of the graphical interface including text of the data content that is associated with the semantic representation to which the selected one of the plurality of members corresponds, the second view of the graphical interface further including a list of entries each being selectable and associated with a respective one of the additional content references that are associated with the semantic representation to which the selected one of the plurality of members corresponds;

wherein if the selected one of the plurality of members is the first one of the plurality of members:

the text of the data content included in the second view comprises text of the first data content, and the list of entries that are selectable and included in the second view includes an entry associated with the second data content.

2. A method according to claim 1, wherein associating the third semantic representation with the first data content and with the second data content comprises:

associating the third semantic representation with a first reference to a storage location of the first data content and with a second reference to a storage location of the second data content, and wherein associating the first semantic representation with the first data content and comprises:

associating the first semantic representation with the first reference to a storage location of the first data content.

3. A method according to claim 1, wherein the first semantic representation of the first data content comprises a first semantic digest defining a plurality of entity types and one or more instances of each of the plurality of entity types which are within the first data content, and wherein the third semantic representation comprises a third semantic digest of a third plurality of entity types and one or more instances of each of the third plurality of entity types which are within the first data content or the second data content.

4. A method according to claim 3, wherein the first semantic digest is a first resource definition framework graph, wherein the second semantic representation comprises a second resource definition framework graph of a second plurality of entity types and one or more instances of each of the second plurality of entity types which are within the second data content, wherein the third semantic digest is a third resource definition framework graph, and wherein generating the third semantic representation comprises performing a Union operation between the first resource definition framework graph and the second resource definition framework graph.

5. A method according to claim 3, wherein determining whether the first semantic representation is similar to the second semantic representation comprises:

determining a number of shared instances between the one or more instances of each of the plurality of entity types of the first semantic digest and one or more instances of each of a second plurality of entity types which are within the second data content; and determining whether the number of shared instances is greater than a threshold number.

6. A method according to claim 5, wherein determining whether the first semantic representation is similar to the second semantic representation comprises:

determining a ratio of the number of shared instances to the smaller of the one or more instances of each of the plurality of entity types and the one or more instances of each of the second plurality of entity types; and determining whether the ratio is greater than a threshold ratio.

7. A non-transitory medium storing processor-executable program code, the program code executable by a device to:

receive first data content;

generate a first semantic representation of the first data content;

determine whether the first semantic representation is similar to a second semantic representation of second data content;

generate a third semantic representation based on the first semantic representation and on the second semantic representation, and associate the third semantic representation with the first data content and with the second data content if the first semantic representation is similar to the second semantic representation;

associate the first semantic representation with the first data content if the first semantic representation is not similar to the second semantic representation;

display a first view of a graphical interface, the first view of the graphical interface including a list that includes a plurality of members each being selectable by a user and corresponding to a respective semantic representation, each one of the plurality of members including an indication of data content associated with the semantic representation to which the one of the plurality of members corresponds, each one of the plurality of members indicating a number that reflects a number of additional content references that are associated with the semantic representation to which the one of the plurality of members corresponds;

wherein if the first semantic representation is similar to the second semantic representation and the third semantic representation is associated with the first data content and with the second data content:
  a first one of the plurality of members in the list corresponds to the third semantic representation associated with the first data content and with the second data content, the first one of the plurality of members including an indication of the first data content, the first one of the plurality of members indicating a number that reflects a number of additional content references that are associated with the third semantic representation, one of the additional content references associated with the third semantic representation being the second data content;
  the program code further executable by the device to:
    after selection of one of the plurality of members in the list of the first view, display a second view of the graphical interface, the second view of the graphical interface including text of the data content that is associated with the semantic representation to which the selected one of the plurality of members corresponds, the second view of the graphical interface further including a list of entries each being selectable and associated with a respective one of the additional content references that are associated with the semantic representation to which the selected one of the plurality of members corresponds;
    wherein if the selected one of the plurality of members is the first one of the plurality of members:
      the text of the data content included in the second view comprises text of the first data content, and
      the list of entries that are selectable and included in the second view includes an entry associated with the second data content.

8. A medium according to claim 7, wherein the program code executable to associate the third semantic representation with the first data content and with the second data content comprises program code executable by a device to:
  associate the third semantic representation with a first reference to a storage location of the first data content and with a second reference to a storage location of the second data content, and
  wherein the program code executable to associate the first semantic representation with the first data content and comprises program code executable by a device to:
  associate the first semantic representation with the first reference to a storage location of the first data content.

9. A medium according to claim 7, wherein the first semantic representation of the first data content comprises a first semantic digest defining a plurality of entity types and one or more instances of each of the plurality of entity types which are within the first data content, and
  wherein the third semantic representation comprises a third semantic digest of a third plurality of entity types and one or more instances of each of the third plurality of entity types which are within the first data content or the second data content.

10. A medium according to claim 9,
  wherein the first semantic digest is a first resource definition framework graph,
  wherein the second semantic representation comprises a second resource definition framework graph of a second plurality of entity types and one or more instances of each of the second plurality of entity types which are within the second data content,
  wherein the third semantic digest is a third resource definition framework graph, and wherein the program code executable to generate the third semantic representation comprises program code executable by a device to perform a Union operation between the first resource definition framework graph and the second resource definition framework graph.

11. A medium according to claim 9, wherein the program code executable to determine whether the first semantic representation is similar to the second semantic representation comprises program code executable by a device to:
  determine a number of shared instances between the one or more instances of each of the plurality of entity types of the first semantic digest and one or more instances of each of a second plurality of entity types which are within the second data content; and
  determine whether the number of shared instances is greater than a threshold number.

12. A medium according to claim 11, wherein the program code executable to determine whether the first semantic representation is similar to the second semantic representation comprises program code executable by a device to:
  determine a ratio of the number of shared instances to the smaller of the one or more instances of each of the plurality of entity types and the one or more instances of each of the second plurality of entity types; and
  determine whether the ratio is greater than a threshold ratio.

13. A system comprising:
  a memory system storing processor-executable program code; and
  a processor to execute the processor-executable program code in order to cause the computing device to:
  receive first data content;
  generate a first semantic representation of the first data content;
  determine whether the first semantic representation is similar to a second semantic representation of second data content;
  generate a third semantic representation based on the first semantic representation and on the second semantic representation, and associate the third semantic representation with the first data content and with the second data content if the first semantic representation is similar to the second semantic representation;
  associate the first semantic representation with the first data content if the first semantic representation is not similar to the second semantic representation;
  display a first view of a graphical interface, the first view of the graphical interface including a list that includes a plurality of members each being selectable by a user and corresponding to a respective semantic representation, each one of the plurality of members including an indication of data content associated with the semantic representation to which the one of the plurality of members corresponds, each one of the plurality of members indicating a number that reflects a number of additional content references that are associated with the semantic representation to which the one of the plurality of members corresponds;
  wherein if the first semantic representation is similar to the second semantic representation and the third semantic representation is associated with the first data content and with the second data content:
    a first one of the plurality of members in the list corresponds to the third semantic representation associated with the first data content and with the second data content, the first one of the plurality of members including an indication of the first data content, the first one of the plurality of members indicating a number that reflects a number of additional content references that are associated with the third semantic representation, one of the additional content references associated with the third semantic representation being the second data content;

the processor to further execute the processor-executable program code in order to cause the computing device to:

after selection of one of the plurality of members in the list of the first view, display a second view of the graphical interface, the second view of the graphical interface including text of the data content that is associated with the semantic representation to which the selected one of the plurality of members corresponds, the second view of the graphical interface further including a list of entries each being selectable and associated with a respective one of the additional content references that are associated with the semantic representation to which the selected one of the plurality of members corresponds;

wherein if the selected one of the plurality of members is the first one of the plurality of members:

the text of the data content included in the second view comprises text of the first data content, and the list of entries that are selectable and included in the second view includes an entry associated with the second data content.

14. A system according to claim 13, wherein association of the third semantic representation with the first data content and with the second data content comprises:

association of the third semantic representation with a first reference to a storage location of the first data content and with a second reference to a storage location of the second data content, and wherein association of the first semantic representation with the first data content and comprises:

association of the first semantic representation with the first reference to a storage location of the first data content.

15. A system according to claim 13, wherein the first semantic representation of the first data content comprises a first semantic digest defining a plurality of entity types and one or more instances of each of the plurality of entity types which are within the first data content, and wherein the third semantic representation comprises a third semantic digest of a third plurality of entity types and one or more instances of each of the third plurality of entity types which are within the first data content or the second data content.

16. A system according to claim 15, wherein the first semantic digest is a first resource definition framework graph, wherein the second semantic representation comprises a second resource definition framework graph of a second plurality of entity types and one or more instances of each of the second plurality of entity types which are within the second data content, wherein the third semantic digest is a third resource definition framework graph, and wherein generation of the third semantic representation comprises program code executable by a device to perform a Union operation between the first resource definition framework graph and the second resource definition framework graph.

17. A system according to claim 15, wherein determination of whether the first semantic representation is similar to the second semantic representation comprises:

determination of a number of shared instances between the one or more instances of each of the plurality of entity types of the first semantic digest and one or more instances of each of a second plurality of entity types which are within the second data content; and determination of whether the number of shared instances is greater than a threshold number.

18. A system according to claim 17, wherein determination of whether the first semantic representation is similar to the second semantic representation comprises:

determination of a ratio of the number of shared instances to the smaller of the one or more instances of each of the plurality of entity types and the one or more instances of each of the second plurality of entity types; and determination of whether the ratio is greater than a threshold ratio.

* * * * *